United States Patent [19]
Goutzoulis et al.

[11] Patent Number: 5,751,242
[45] Date of Patent: May 12, 1998

[54] TRANSMIT-RECEIVE FIBER-OPTIC MANIFOLD FOR PHASE ARRAY ANTENNAS

[75] Inventors: Anastasios P. Goutzoulis, Pittsburgh; John M. Zomp, North Huntingdon, both of Pa.

[73] Assignee: Northrop Grumman Corporation, Los Angeles, Calif.

[21] Appl. No.: 521,202

[22] Filed: Sep. 30, 1995

[51] Int. Cl.[6] .................................................. G01S 13/00
[52] U.S. Cl. .......................... 342/158; 342/157; 342/372; 342/375
[58] Field of Search .................................. 342/372, 375, 342/81, 157, 158

[56] References Cited

U.S. PATENT DOCUMENTS

| | | |
|---|---|---|
| 4,688,884 | 8/1987 | Scifres et al. . |
| 4,725,844 | 2/1988 | Goodwin et al. ............... 342/374 |
| 4,736,463 | 4/1988 | Chavez ........................... 455/606 |
| 4,954,834 | 9/1990 | Buck . |
| 5,001,336 | 3/1991 | de la Chapelle ............... 250/208.2 |
| 5,029,306 | 7/1991 | Bull et al. ....................... 342/368 |
| 5,066,088 | 11/1991 | Davies et al. . |
| 5,101,455 | 3/1992 | Goutzoulis . |
| 5,103,495 | 4/1992 | Goutzoulis . |
| 5,125,051 | 6/1992 | Goutzoulis et al. . |
| 5,177,630 | 1/1993 | Goutzoulis et al. . |
| 5,233,673 | 8/1993 | Vali et al. . |
| 5,291,569 | 3/1994 | Goutzoulis et al. . |
| 5,297,273 | 3/1994 | Goutzoulis et al. . |
| 5,299,232 | 3/1994 | La Rosa et al. ................. 375/99 |
| 5,305,009 | 4/1994 | Goutzoulis et al. . |
| 5,333,000 | 7/1994 | Hietala et al. ................... 342/368 |
| 5,365,239 | 11/1994 | Stilwell, Jr. ..................... 342/368 |

*Primary Examiner*—Theodore M. Blum
*Attorney, Agent, or Firm*—Walter G. Sutcliff

[57] ABSTRACT

A signal manifold having a source signal converter coupled to an RF source for converting a source electronic signal from the RF source into an optical signal. The manifold has an optical coupler, having multiple optical fibers, coupled to the first signal converter; and a sink signal converter coupled to the optical coupler. The sink signal converter converts the optical signal from the coupler into a sink electronic signal and conveys that electronic signal to an RF sink.

The manifold can be a transmit manifold, or a receive manifold. In addition, a transmit manifold and a receive manifold can be combined to provide a bi-directional signal manifold. The invention herein also provides low-loss asymmetric fiber-optic combiner which includes multiple optical fibers, each fiber having cladding removed from the respective fiber end, exposing the fiber core. The cores are joined together in a predefined configuration and each are optically coupled to a plenum optical fiber. A method for fabricating the low-loss asymmetric fiber-optic combiner also is provided and includes the steps of etching a portion of multiple optical fibers, and removing the cladding from the optical core, producing multiple exposed optical core segments. An optical core bundle with a bundle end is formed by collaterally joining each of the multiple exposed optical core segments with the others. A planar bundle end is formed from the optical core bundle end by polishing, and rendering coplanar, the bundle end. The bundle end is coupled to a plenum optical fiber.

6 Claims, 10 Drawing Sheets

TRANSMIT-RECEIVE FIBER-OPTIC MANIFOLD FOR PHASE ARRAY ANTENNAS

STATEMENT OF GOVERNMENT INTEREST

The United States Government has rights in this invention under the terms of Contract No. F30602-92-C-0061.

BACKGROUND OF THE INVENTION

1. Field of the Invention

This invention relates to fiber-optic (FO) radio-frequency (RF) signal manifolds between a signal source and a signal detector, particularly to fiber-optic manifolds for phased array antennas, and most particularly, to fiber-optic manifolds which can employ low-loss asymmetric fiber-optic signal combiners therein.

2. Description of the Prior Art

Phased array antennas generally use signal manifolds as the interface between phased array antenna (PAA) elements and the transmitter-receiver. Such manifolds also can be used to implement beamforming in which outgoing signals can be selectively distributed to the array elements in the transmit mode and array element signal components can be coherently combined in the receive mode. Conventional manifolds can employ metal waveguides or coaxial cables, stripline combiner circuits, and the like. These manifolds can grow increasingly large and heavy in proportion to the number of elements in the PAA.

Certain applications such as airborne and space-borne radar systems, demand compact, lightweight components to minimize the impact of the radar system upon the size, weight, and fuel consumption of the vehicle. For example, it is well known that an increase of only one pound in an aircraft's payload can correspond to an increase of about 3.0 to 4.5 pounds in the aircraft's weight. In the event that a weight savings of about 1,500 pounds can be effected, an airframe weight savings of between about 4,500 to 6,700 pounds may be realized. Such weight reductions can result in decreased airframe size, lower operating cost and fuel consumption, and increased flight time. For space-based platforms, the savings can be more significant because it has been estimated that a 1 kilogram weight reduction can correspond to a platform cost reduction of about $20,000. For PAAs having multiple, simultaneous, independent beam capability, multiple manifolds may be required, and the resulting weight penalty, or savings, could be multiplied accordingly.

By their nature, conventional signal manifolds and their components tend to thwart the reductions of weight and volume that may be desired for the intended application. FO technology is an excellent candidate for compact, lightweight RF manifolds for PAAs because optical fibers tend to be physically small, lightweight, and flexible. What is needed, then, is an FO signal manifold for a PAA that is substantially more compact and lightweight than conventional manifolds that use waveguides, coaxial cables, and the like.

SUMMARY OF THE INVENTION

The invention herein provides a signal manifold having a source signal converter coupled to an RF source for converting a source electronic signal from the RF source into an optical signal. The manifold also has an optical coupler, which includes multiple optical fibers, coupled to the first signal converter; and a sink signal converter coupled to the optical coupler. The sink signal converter converts the optical signal received from the coupler into a sink electronic signal and conveys that electronic signal to an RF sink.

The manifold can be a transmit manifold, in which case, the RF source is an RF transmitter and the source electronic signal is an RF transmission signal. Furthermore, a transmit source signal converter can include an optical source and a first fiber-optic divider coupled between the optical source and optical coupler. Also, the sink signal converter includes an optical detector, coupled to the optical coupler, for producing the sink electronic signal in response to the optical signal.

In one embodiment of the transmit manifold, the RF source is a UHF-band transmitter, the RF sink is a phased array antenna, and the source electronic signal is an UHF-band transmission signal. In another embodiment of the transmit manifold, the RF source is a "S"-band transmitter, the RF sink is a phased array antenna, and the source electronic signal is a "S"-band transmission signal.

The manifold can be a receive manifold where the RF source is an RF antenna and the source electronic signal is a received RF signal. In this embodiment, the source signal converter can include multiple optical sources, selectively coupled to the fibers of the optical coupler, for converting the received RF signal into the optical signal. In addition, the sink signal converter can include a first optical combiner coupled to the optical fibers for receiving said optical signal, and an optical detector for producing the sink electronic signal in response to the optical signal.

In one embodiment of the receive manifold, the RF source is a UHF-band transmitter, the RF sink is a phased array antenna, and the source electronic signal is an UHF-band transmission signal. In another embodiment of the receive manifold, the RF source is an "S"-band transmitter, the RF sink is a phased array antenna, and the source electronic signal is an "S"-band transmission signal.

Each of the aforementioned optical sources can include an electro-optic transducer for producing at least a portion of the optical signal with a preselected wavelength. For frequencies less than about 1.0 GHz, the transducer can be a laser diode and a laser diode driver that energizes the laser diode in response to the source electronic signal. For higher frequencies of about at least 1.0 GHz, the transducer can be a laser that produces an optical signal at a carrier frequency and an electro-optic modulator for converting the source electronic signal and modulating it onto the carrier signal to produce the transmit optical signal.

In addition to multiple optical fibers, a transmit manifold can have multiple dividers, and a receive manifold can have multiple combiners, which can be fiber-optic dividers and combiners. Furthermore, at operating frequencies of about at least 1.0 GHz, the transmit manifold can include an RF divider, and the receive manifold can include an RF combiner. When fiber-optic combiners are used, it is preferred that at least one combiner be a low-loss asymmetric combiner.

A signal manifold according to the invention herein also can be a paired transmit/receive manifold which includes a source transmit signal converter, an optical transmit coupler, a sink transmit signal converter, a source receive signal converter, an optical receive coupler, a sink receive signal converter, and a duplexer. The sink transmit signal converter and source receive signal converter are coupled by the duplexer to the phased array antenna, the use of which is shared between the transmit and receive manifolds. The converters and couplers employed in the paired manifold can include the aforementioned converters and couplers for respective transmit and receive modes, that are suitably selected and coupled to accommodate the system operating frequency.

The invention herein also provides a low-loss asymmetric fiber-optic combiner which includes multiple optical fibers, each having a core, and cladding disposed therearound. Each of the optical fibers has the cladding removed for a preselected distance from the respective fiber end, thereby exposing the core of each of the fibers. The cores are joined together in a predefined configuration, such as the closest-packing configuration. The combiner also includes a plenum optical fiber which is optically coupled to each of the fibers.

A method for fabricating the low-loss asymmetric fiber-optic combiner also is provided. The method includes the step of etching a selected end portion of multiple optical fibers in a selected etchant. When optical fibers are glass optical fiber, the preselected etchant can be hydrofluoric acid. Each of the optical fibers has an optical core and cladding therearound, and the etching substantially removes the cladding from the optical core, thereby producing multiple exposed optical core segments. An optical core bundle with a bundle end is formed by collaterally joining each of the multiple exposed optical core segments with the others, i.e., aligning the individual fibers side-by-side. Joining can be accomplished by gluing the exposed optical core segments together. A planar bundle end is formed from the optical core bundle end by polishing the bundle end to render coplanar each of the exposed optical core segments. The method continues by coupling the planar bundle end to an end of a plenum optical fiber using a preselected coupling technique. In general, the diameter of the plenum optical fiber core is at least that of the bundle diameter. The preselected coupling technique can include direct fusion of the planar bundle end to the plenum optical fiber end; applying a preselected optical cement to at least one of the bundle end and the fiber end, and butt-coupling the ends together; or interposing a preselected coupling lens between the bundle end and the plenum fiber end.

When the optical fibers include a buffer coat around the cladding, the above method can be preceded by stripping a portion of the buffer coating from selected end portions of the optical fibers, thereby producing stripped fiber end segments; cleaving each of the stripped fiber end segments to ensure adequate polishing of the ends; and cleaning each of the stripped fiber ends with a preselected solvent, such as acetone.

BRIEF DESCRIPTION OF THE DRAWINGS

The invention will be more readily apparent to those skilled in the art by reference to the accompanying drawings wherein.

DETAILED DESCRIPTION OF THE PREFERRED EMBODIMENTS

Fiber-optic (FO) technology is desirable for producing lightweight and small-volume RF manifolds for phased array antennas (PAA), because optical fibers are generally physically small, lightweight, and flexible. For example, in comparison to the mass of typical microwave coaxial cable, which can be about 40 grams/m, the mass of buffered optical fiber is about 0.07 grams/m and about 0.8 grams/m for space-qualified optical fiber. In addition, the use of optical fibers produces an extremely low loss and dispersion of the desired signal when compared to microwave coaxial cable. Furthermore, optical fiber tends to provide excellent transmission stability by virtue of the small ratio of RF signal bandwidth to optical carrier frequency, and phase variation with temperature for microwave signals on an optical carrier in the fiber is nearly an order of magnitude lower than the corresponding phase variation in a coaxial line. Furthermore, optical fiber is an essentially non-conductive dielectric and therefore does not disturb the RF field, is secure from surreptitious surveillance, and generally is immune from electromagnetic interference and RF crosstalk. With optical cable, optical wavelength division multiplexing can be used to minimize the number of lines in the PAA feed link.

Figure 1:
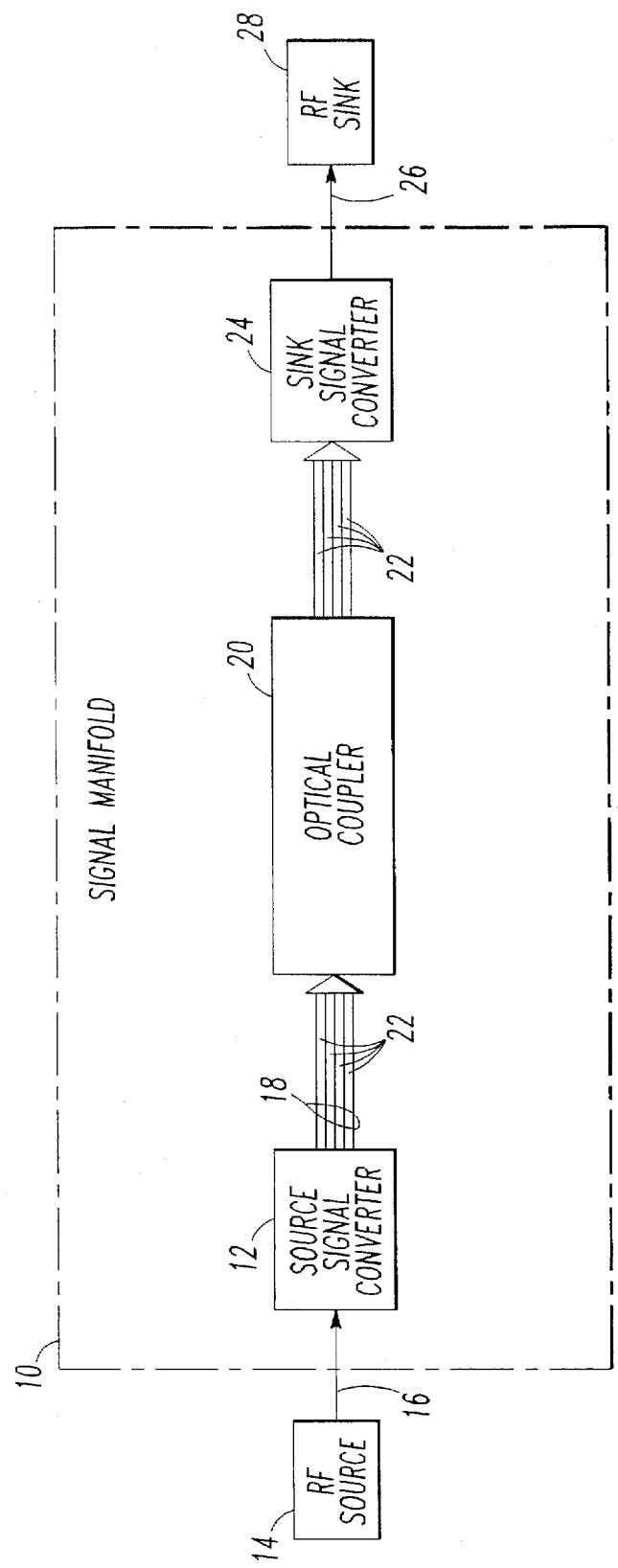
FIG. 1 is a block diagram illustrating a signal manifold according to the invention herein.

FIG. 1 illustrates an embodiment of signal manifold 10. Source signal converter 12, can receive a source electronic signal 16 from RF source 14. RF source 14 can provide an RF signal with a predetermined frequency which may be, for example, from about 3 MHz to about 300 GHz. Converter 12 converts electronic signal 16 into optical signal 18, which optical signal 18 is conveyed by optical coupler 20 to sink signal converter 24. Signal converter 24 can transform optical signal 18 into sink electronic signal 26 which is conveyed to RF sink 28. Optical coupler 20 can include multiple optical fibers 22 to convey optical signal 18 from converter 12 to converter 24.

In general, a single FO manifold may not be reversible. Unlike a conventional coaxial cable manifold, a FO manifold can be optimized for either transmit or receive, but not for both. This is primarily because single-mode, N:1 FO combiners and dividers are generally symmetric devices and thus their combination loss is equal to their splitting loss. For example, if a single N:1 FO combiner/divider is used in conjunction with a single FO manifold, excessive losses in the receive mode may occur because these losses increase with the square of the number of combined channels due to the square-law relation between optical intensity and RF signal power. Therefore, it is desirable to provide separate manifold structures for each of the transmit and receive modes.

Figure 2A:
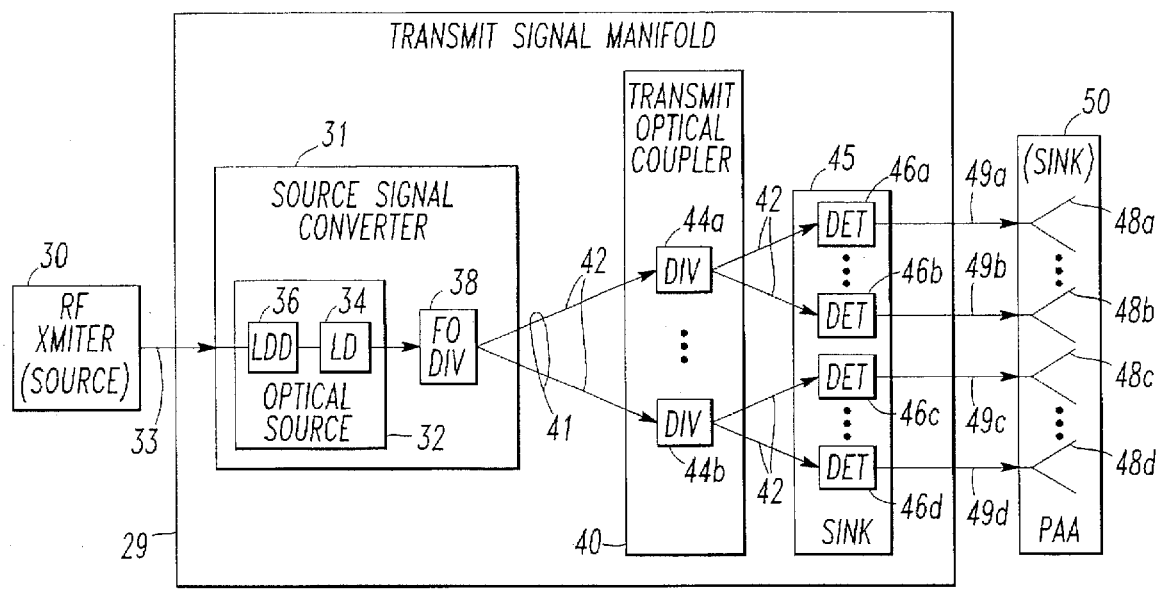
FIG. 2a is a block diagram illustrating one embodiment of a transmit signal manifold according to the invention herein.

FIG. 2a illustrates transmit signal manifold 29 which is intended to convey an RF signal from the RF source, RF transmitter 30, to the RF sink, phased array antenna (PAA) 50. Transmitter 30 is an RF source that provides transmit source electronic signal 33 to transmit source signal converter 31. Converter 31 can contain optical source 32 and first fiber-optic divider 38 for converting electronic signal 33 into optical signal 41. Laser diode driver 36 can excite laser diode 34 to provide optical signal 41 with a preselected wavelength. Signal 41 is split by divider 38 and directed to transmit optical coupler 40. It is preferred that divider 38 be a fiber-optic divider. To accommodate large phased array antennas which may have many radiating elements, coupler 40 can include second fiber-optic dividers 44a,b to further split signal 41. Because of the aforementioned advantages of optical fibers, optical coupler 40, which includes optical fibers 42, can provide for a substantial spatial separation between transmitter 30 and antenna 50 without significant loss of signal quality. Optical signal 41 can be received by transmit sink signal converter 45 which converts optical signal 41 into transmit sink electronic signal 49a–d, which are, in turn, provided to antenna elements 48a–d of PAA 50. The optical-to-electronic conversion can be effected by optical detectors 46a–d, responsive to optical signal 41.

Figure 2B:
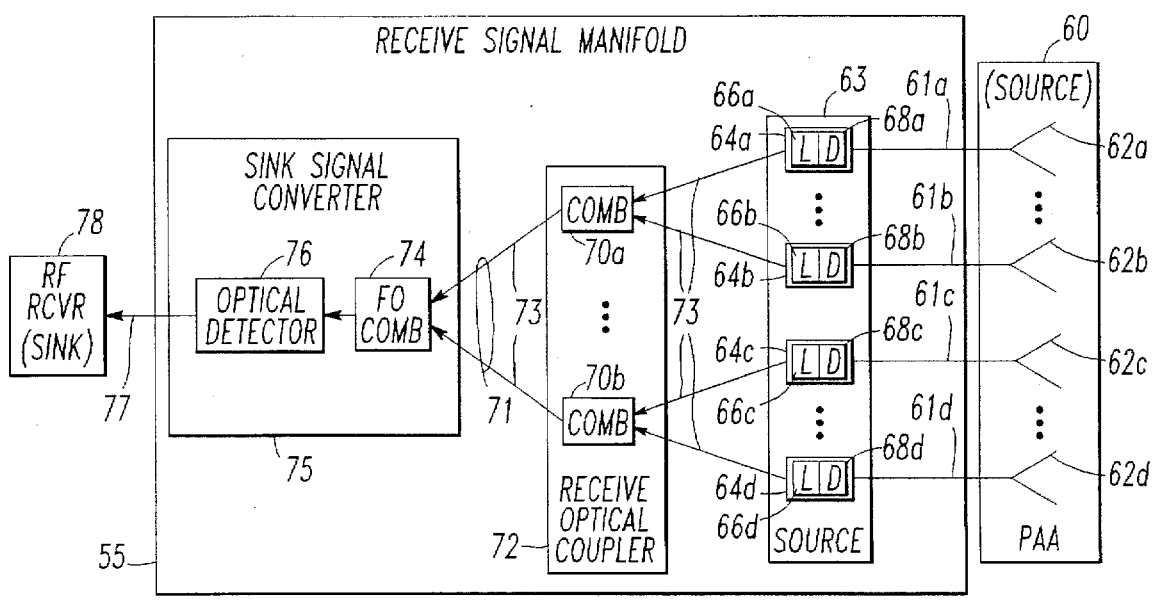
FIG. 2b is a block diagram illustrating one embodiment of a receive signal manifold according to the invention herein.

Similarly, FIG. 2b illustrates receive signal manifold 55 which can be used to convey an RF signal from PAA 60, which is the RF source, to RF receiver 78, which is the RF sink. Receive source electronic signal 61a–d is provided to receive source signal converter 63 by antenna elements 62a–d. Converter 63 can have multiple optical sources 64a–d which receive and convert signals 61a–d into receive optical signal 71. In each of sources 64a–d are laser diodes 66a–d which are excited by laser diode drivers 68a–d to provide receive optical signal 71 with a preselected wavelength. Receive optical coupler 72 is coupled to receive source signal converter 63 and to receive sink signal converter 75. In addition to optical fibers 73, optical coupler 72 can include multiple second combiners 70a,b which combine the optical signals produced by receive source signal converter 63 in the desired manner. Receive sink signal converter 75 receives optical signal 71 from optical coupler 72, and transforms signal 71 into receive sink electronic signal 77. Converter 75 can include fiber-optic combiner 74 for coherently combining the portions of signal 71, for detection by optical detector 76. Detector 76 generates electronic signal 77 responsive to optical signal 71 and conveys signal 77 to RF receiver 78.

Figure 3:
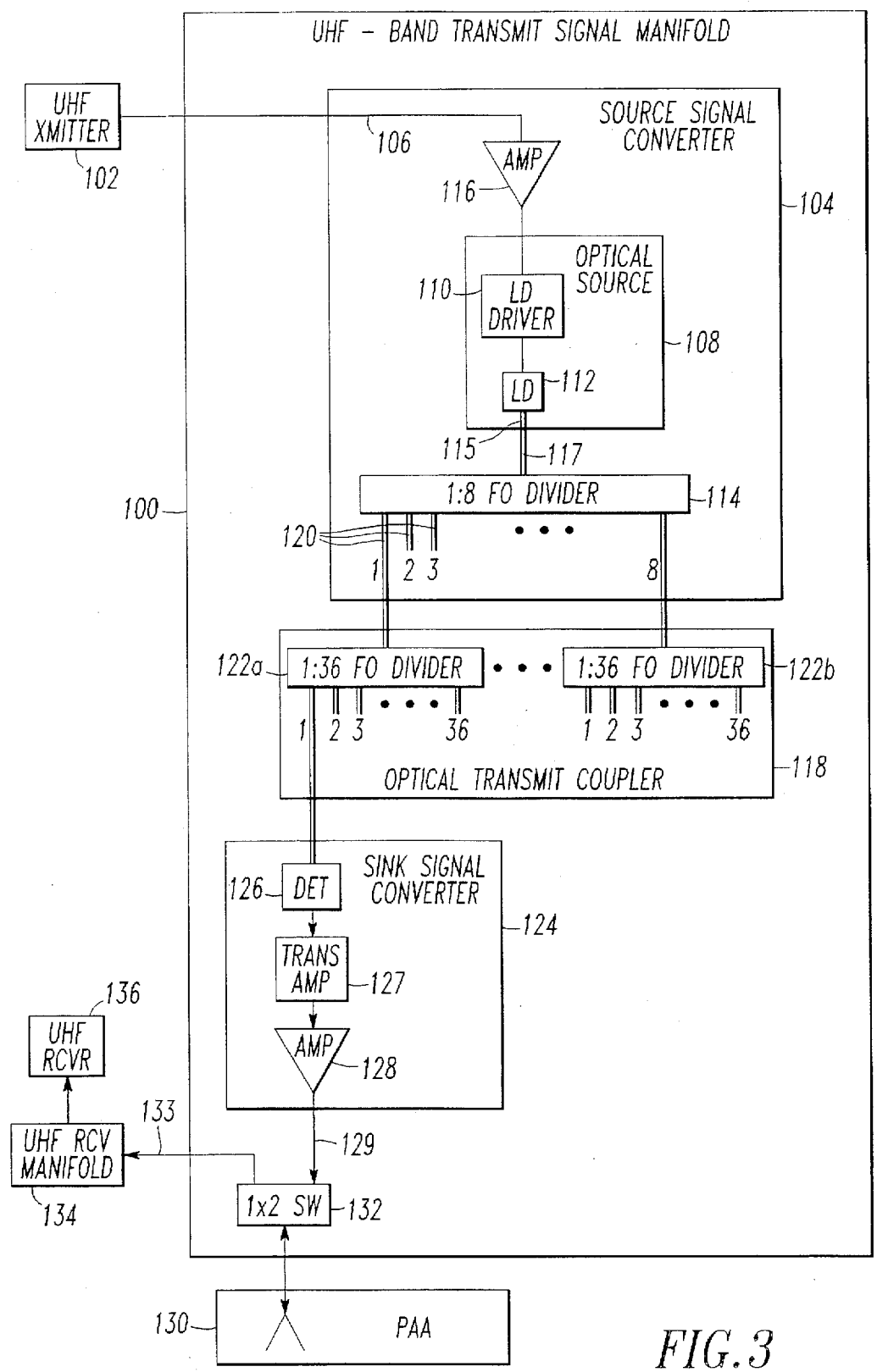
FIG. 3 is a block diagram illustrating one embodiment of a transmit signal manifold for use with UHF-band signals.

To accommodate the physical limitations imposed by different signal frequency bands, each of the transmit and receive manifolds can be modified to operate more efficiently within a particular signal frequency band. FIG. 3 illustrates transmit signal manifold 100 which is intended for use within the UHF frequency band, which is generally between 300 MHz and 1,000 MHz. In FIG. 3, the RF source is UHF transmitter 102, which provides a transmit source electronic signal 106 to transmit source signal converter 104. Converter 104 converts electronic signal 106 into optical signal 115. Signal 115 is coupled through transmit optical coupler 118 to transmit sink signal converter 124, where it is converted into transmit electronic signal 129. Converter 104 can include optical source 108 and divider 114. Divider 114 can be a fiber-optic divider, such as the MGC 8010 coupler, produced by Corning Glass Works, Corning, N.Y. Optical source 108 can include laser diode driver 110 which excites laser diode 112 to produce optical signal 115 with a preselected wavelength, responsive to electronic signal 106. In the case where PAA 130 has numerous antenna elements, it may be desirable to use multiple converters 104 and, thus, amplification of signal 106 by amplifier 116 in each of the converters 104 may be preferred.

Laser diode 112 can be a single diode with a moderate power output and a preselected wavelength of about 830 nm. Such a laser diode is, for example, model SDL-2350 by Spectra Diode Laboratories, San Jose, Calif. The output of diode 112 can be coupled with 1:8 FO divider having a 100/125 μm input fiber and multiple 50/125 μm output fibers. Divider 114 can include optical fibers 120, each of which can drive a 1:36 FO divider 122a,b. In this manner, up to 288 antenna elements can be accommodated in PAA 130.

Transmit sink signal converter 124 can include optical detector 126, transimpedance amplifier 127, and voltage amplifier 128. In general, detector 126 is responsive to optical signal 115 such that the resulting transmit sink electronic signal 129 corresponds to transmit source electronic signal 106. Because it is desirable to use PAA 130 for both the transmit and receive modes, duplexer 132 can be provided to direct a transmitted signal 129 to PAA 130 or direct a received signal 133 to receive manifold 134 which, in turn, couples signal 133 to receiver 136.

The use of transimpedance amplifier 127 and voltage amplifier 128 are intended to compensate for signal loss which may be incurred through the use of the FO dividers 114, and 122a,b. Where detector 126 is essentially a current source, amplifier 127 can be a high-gain, high-impedance amplifier having feedback, which obtains gain with both low noise and large dynamic range. Such a transimpedance amplifier can be the ITA-06300, produced by Avantek Corp., Santa Clara, Calif. Such amplifiers typically operate at frequencies in excess of 4.5 GHz with transimpedances in the range of 250–4,000 Ω thereby providing gain, relative to 50 Ω, of between about 30 dB to about 38 dB.

Amplifier 128 may be used to augment the gain available at the output of amplifier 127. However, the 1 dB-compression output power from amplifier 127 typically is in the +4 dBm to +8 dBm range. Because typical UHF-transmitter-power-per-PAA-element is on the order of a few watts, the desired 22–25 dB gain can readily be implemented using commercially available transistors in a C-class amplifier design. Such transistors can be, for example, Model NRF555 from Motorola Corp., Schaumberg, Ill. This transistor has a 1.5 W output and 13 dB gain over the 425–450 MHz signal range. In addition, suitable UHF-band C-class amplifiers are commercially available including, for example, Model MHW703, C-class amp from Motorola Corporation. The MHW703 typically has a output power capability of approximately 2.3 W over the 450–460 MHz frequency range, with a gain of about 31 dB. Where high-power 830 nm laser diodes are available, manifolds such as transmit manifold 100 can be operated at frequencies up to at least 2 GHz.

Figure 4:
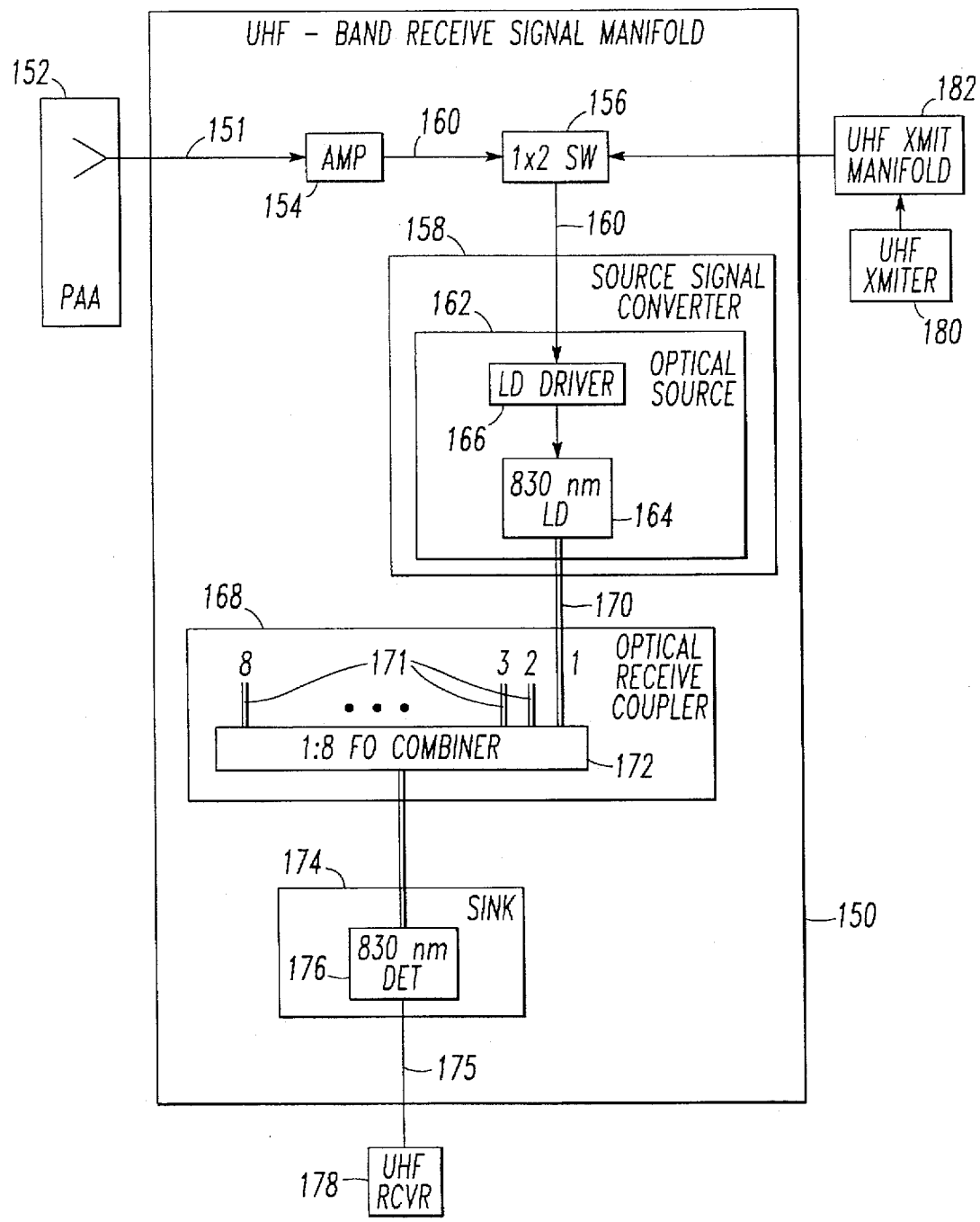
FIG. 4 is a block diagram illustrating one embodiment of a receive signal manifold for use with UHF-band signals.

FIG. 4 illustrates receive signal manifold 150 which also is intended to operate in the UHF frequency band. In general, manifold 150 is provided with received RF signal 151 by PAA 152. Where necessary, signal 151 can be amplified into receive source electronic signal 160 by amplifier 154, which is directed by duplexer 156 to receive source signal converter 158. Converter 158 converts electronic signal 160 into optical signal 170. To effect this conversion, converter 158 can have an optical source 162, which includes laser diode 164 and laser diode driver 166. Driver 166 excites laser diode 164 responsive to signal 160 to provide optical signal 170 with a preselected wavelength. Such wavelengths can be, for example, about 830 nm or about 1300 nm. Converter 158 can be coupled to receive optical coupler 168 which, in turn, is coupled to receive sink signal converter 174. Converter 174 provides receive sink electronic signal 175 which is conveyed to the RF sink, which is UHF receiver 178. Coupler 168 can include optical fibers 171a–c and fiber-optic combiner 172 so that signals from selected elements of PAA 152 can be RF-coherently combined to form the desired signal 175. Converter 174 can have an optical detector 176 which is responsive to the preselected wave length of the optical signal, for example, 830 nm. Duplexer 156 can also be used to direct a transmit signal from transmitter 180 through manifold 182 to PAA 152.

In manifold 150, coherent signal addition of the received RF signals can be performed along either the columns or element rows of PAA 152. For example, for an 8×36-element PAA, additions may be preferred to be along the rows, i.e., the signals from eight elements of PAA 152 are combined into one signal. In this case, thirty-six 8:1 FO combiners 172 can be employed. To minimize the high combination losses of symmetric FO combiners, two alternatives can be used: (1) RF signals can be combined after detection of the RF signal from each individual fiber; and (2) low-loss asymmetric N:1 FO combiners (LAFC) can be employed. The first approach uses conventional microwave RF combiners in conjunction with individual FO links, thus, each antenna element can have its own dedicated FO link. Prior to the RF combiner, an optical detector can be used to detect the RF signal from each link. The outputs of the detectors then can be combined electrically via an RF combiner. This technique reduces optical combination losses at the expense of additional electronic hardware. In the second approach, a low-loss asymmetric FO combiner, such as combiner 172, can be used. Although only one combiner 172 is shown in FIG. 4, thirty-six such combiners can be used where the elements of PAA 152 are arranged as 8×36 array. It is preferred that each combiner 172 be a low-loss asymmetric FO combiner which combines the signals received from each row of PAA 152.

Because UHF-band operation is at a relatively low frequency, many types of optical fibers can be used in conjunction with laser diodes which are typically low-cost devices. For example, laser diode 164 can be coupled into either a single-mode 5/125 µm optical fiber, a single-mode 9/125 µm optical fiber, or a multi-mode 50/125 µm optical fiber, all of which can provide substantially modal-noise-free operation over the UHF-band for hundreds of meters of optical fiber. It is understood that the designation 5/125 µm indicates an optical fiber with an optical core of approximately 5 µm, which core is surrounded by sufficient cladding to provide an optical fiber having a total diameter of 125 µm. Similarly, the designation 9/125 µm indicates an optical fiber with a 9 µm optical core and a 125 µm total diameter. Also, the 50/125 µm designation indicates an optical fiber which has a 50 µm optical core and a total fiber diameter of 125 µm. It is preferred that optical fibers 171 be a graded-index 50/125 µm optical fiber. Optical detector 176 can be a commercially available detector, such as, for example, the NEC Model NDL2102 silicon PIN detector which has a voltage rise time of about 0.5 ns at 40 V reverse bias and a 3-dB bandwidth of about 700 MHz. The NDL2102 detector is manufactured by NEC, Inc., Tokyo, Japan.

Figure 5:
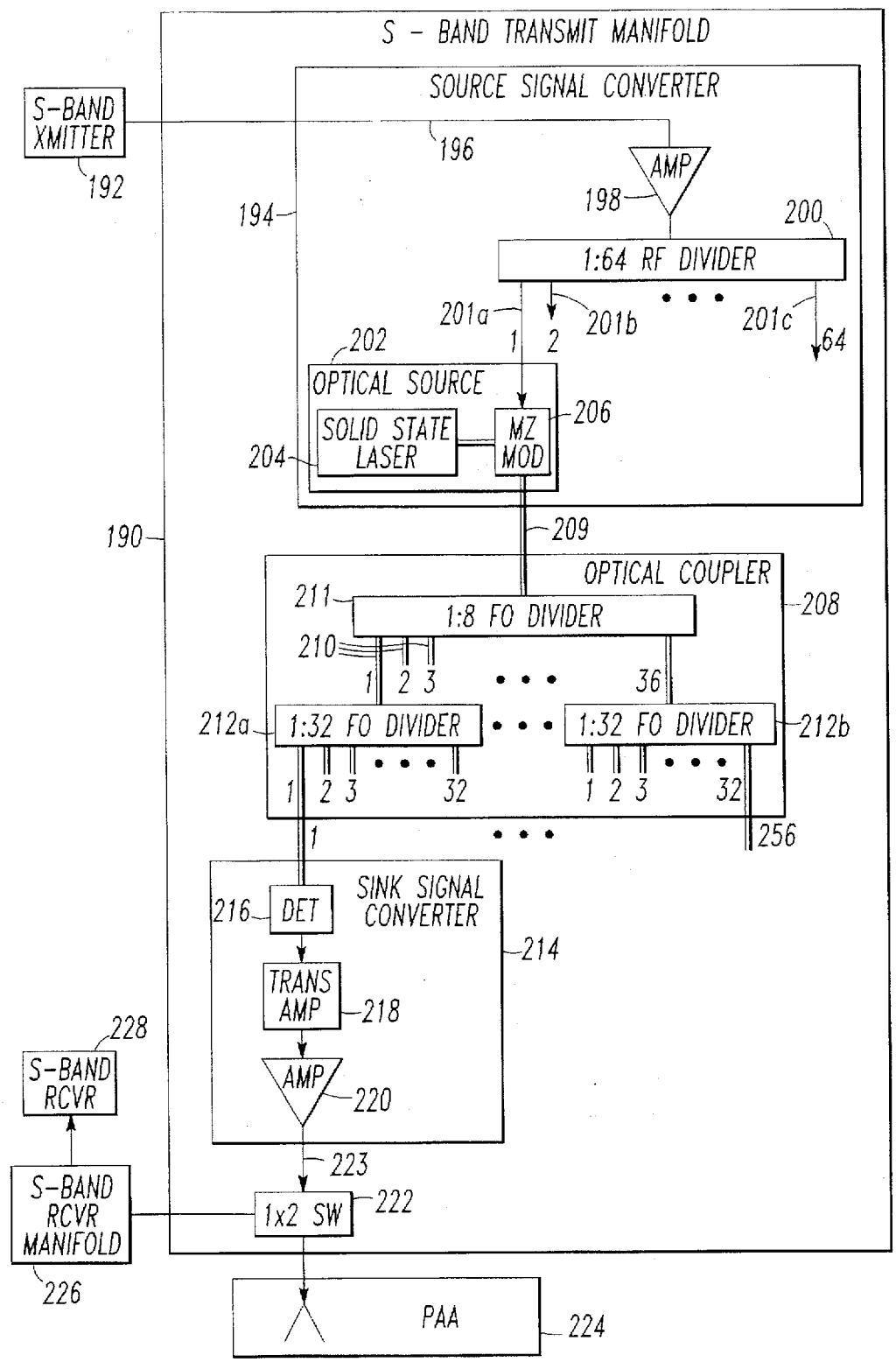
FIG. 5 is a block diagram illustrating one embodiment of a transmit signal manifold for use with S-band signals.

Currently, high-power (>20 mW), directly-modulated laser diodes, that operate at frequencies greater than 2 GHz, are not commercially available. Therefore, a different approach can be used for S-band, or higher frequencies, transmit signal manifold operations. FIG. 5 illustrates one such transmit manifold 190 which is intended for use with higher-frequency operation above 1 GHz such as, for example, the "S" frequency band, i.e., about 2.0 GHz to about 4.0 GHz. Similar to the transmit signal manifolds 29 and 100 in FIGS. 2a and 3, respectively, the RF source, which is S-band transmitter 192 in FIG. 5, provides transmit source electrical signal 196 to transmit source signal converter 194. To accommodate physical limitations which may be imposed by S-band operations, signal 196 can be amplified by amplifier 198 prior to signal division in divider 200. In the embodiment of FIG. 5, divider 200 is a 1:64 RF divider, which thus provides 64 signals, one of which being provided to transmit optical source 202. Each of the 64 outputs of divider 200, as exemplified by outputs 201a–c, can drive an electro-optic modulator, which is preferred to be a Mach-Zehnder (MZ) modulator. The MZ modulates the intensity of a high-power laser 204, which is preferred to be a continuous-wave miniature solid-state laser, such as the Whisper 1.3 1320-175W4 laser-diode-pumped Nd:YAG laser, which can be obtained from AMOCO Corp, Naperville, Ill. Modulator 206 provides optical signal 209 with a preselected wavelength into a first fiber-optic divider 211, which can be a 1:8 fiber-optic divider. Optical fibers 210 from divider 211 each power a second fiber-optic divider 212a,b each of which is preferred to be a 1:32 fiber-optic divider. Although only two second dividers 212a,b are shown, in FIG. 5 where a 64×256 element PAA 224 is used, thirty-two such 1:32 FO dividers can be used. In addition, although one manifold 190 is shown in conjunction with PAA 224, sixty-four such 256-element manifolds 190 can be used. The optical signal transmitted to transmit sink signal converter 214 can be sensed by detector 216 and amplified, as necessary, by transimpedance amplifier 218 and voltage amplifier 220. Detector 216 can be, for example, model HG1210AXA, provided by AT&T Corp., Basking Ridge, N.J. Duplexer 222 can direct transmit sink electronic signal 223 to the appropriate element of PAA 224. Similar to duplexer 132 in FIG. 3, duplexer 222 in FIG. 5 can direct a signal incoming to PAA 224 to S-band receiver manifold 226 and then to the RF sink, which is S-band receiver 228. The transmit manifold of FIG. 5 can operate into the tens of GHz because MZs are commercially available up to about 20 GHz, and may be available for operating frequencies up to about 70 GHz. For operating frequencies where transimpedance amplifiers are not available, extra voltage gain amplifiers, such as amplifier 220, can be used.

Figure 6:
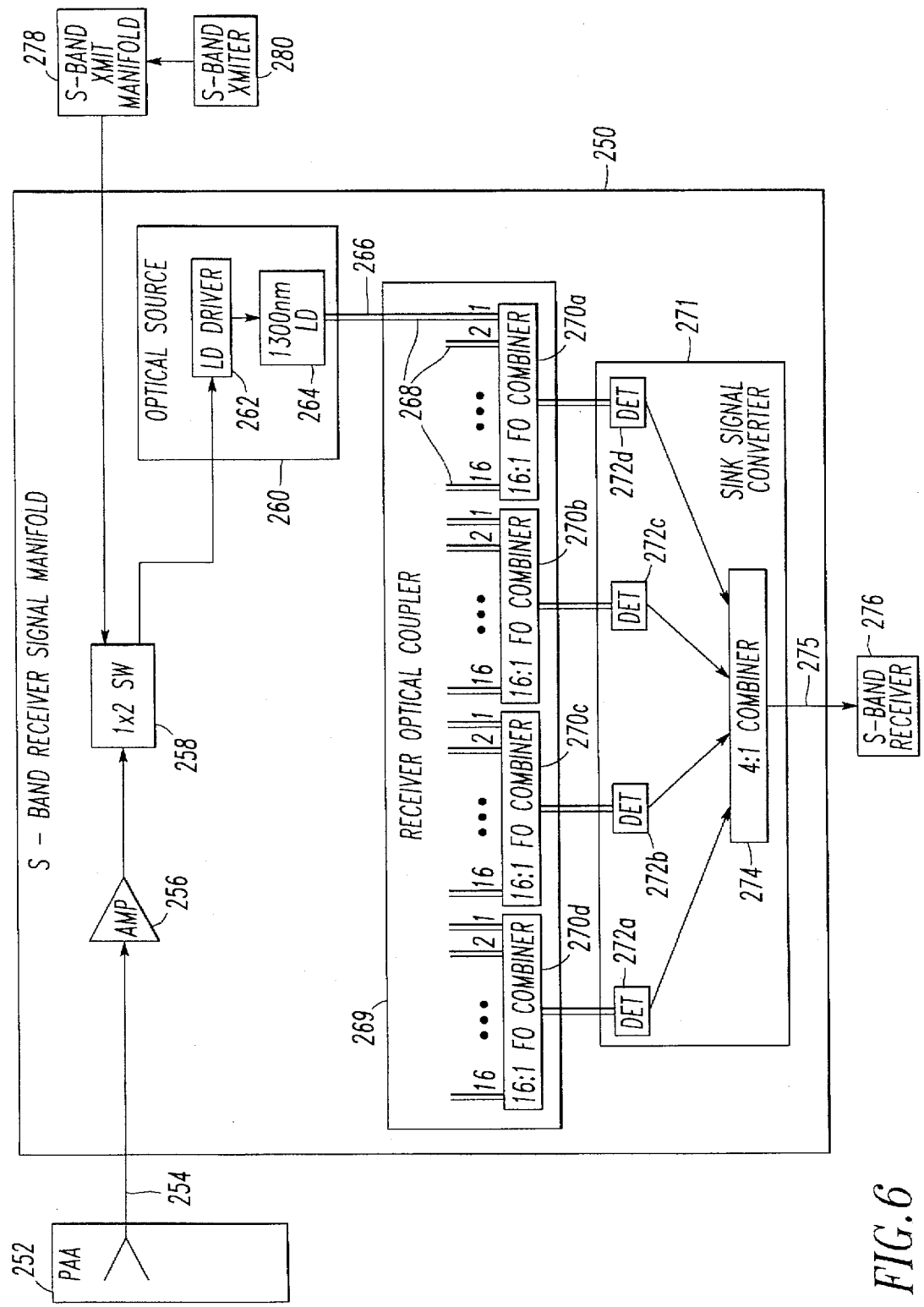
FIG. 6 is a block diagram illustrating one embodiment of a receive signal manifold for use with S-band signals.

FIG. 6 illustrates a receive signal manifold 250 that is intended for use at higher frequencies, such as the S-band frequency range. PAA 252 can transmit a receive source electronic signal to manifold 250 where signal 254 may be amplified by amplifier 256, if necessary. Duplexer 258 directs incoming signal 254 to receive source signal converter 260 which includes an optical source having a laser diode driver 262 and laser diode 264. Driver 262 excites diode 264, responsive to electronic signal 254, to provide an optical signal 266 with a preselected wavelength. For the embodiment shown in FIG. 6, a pre-selected wavelength of about 1300 nm is preferred. Optical signal 266 is received by receive optical coupler 269, which is coupled to converter 260. Coupler 269 generally includes multiple optical fibers 268 and multiple fiber-optic combiners 270a–d, which are preferred to be LAFCs. By using four 16:1 FO combiners 270 and in parallel, a composite 64:1 coupler 269 can be obtained. Because PAA 252 is, for this embodiment, a 64×256 element antenna, a configuration employing 256 couplers are employed. It is desirable to use single-mode 9/125 µm optical fibers as input fibers to combiner 270.

Receive optical coupler 269 is optically coupled to receive sink signal converter 271. Converter 271 can include optical detectors 272a–d, which can be, for example, model PD805A2, an InGaAs optical detector by Mitsubishi, Inc., Tokyo, Japan. The output of detectors 272a–d is received by 4:1 RF combiner 274. Combiner 274 produces receive sink electronic signal 275 that is received by the RF sink, which is S-band receiver 276. The 64:1 hybrid signal addition scheme, embodied by coupler 269 and converter 271, can reduce optical combination losses and minimize the electronic component count. As a result, the total combining loss can be held to approximately that of one 4:1 RF combiner, e.g., about 1–2 dB.

Figure 7:
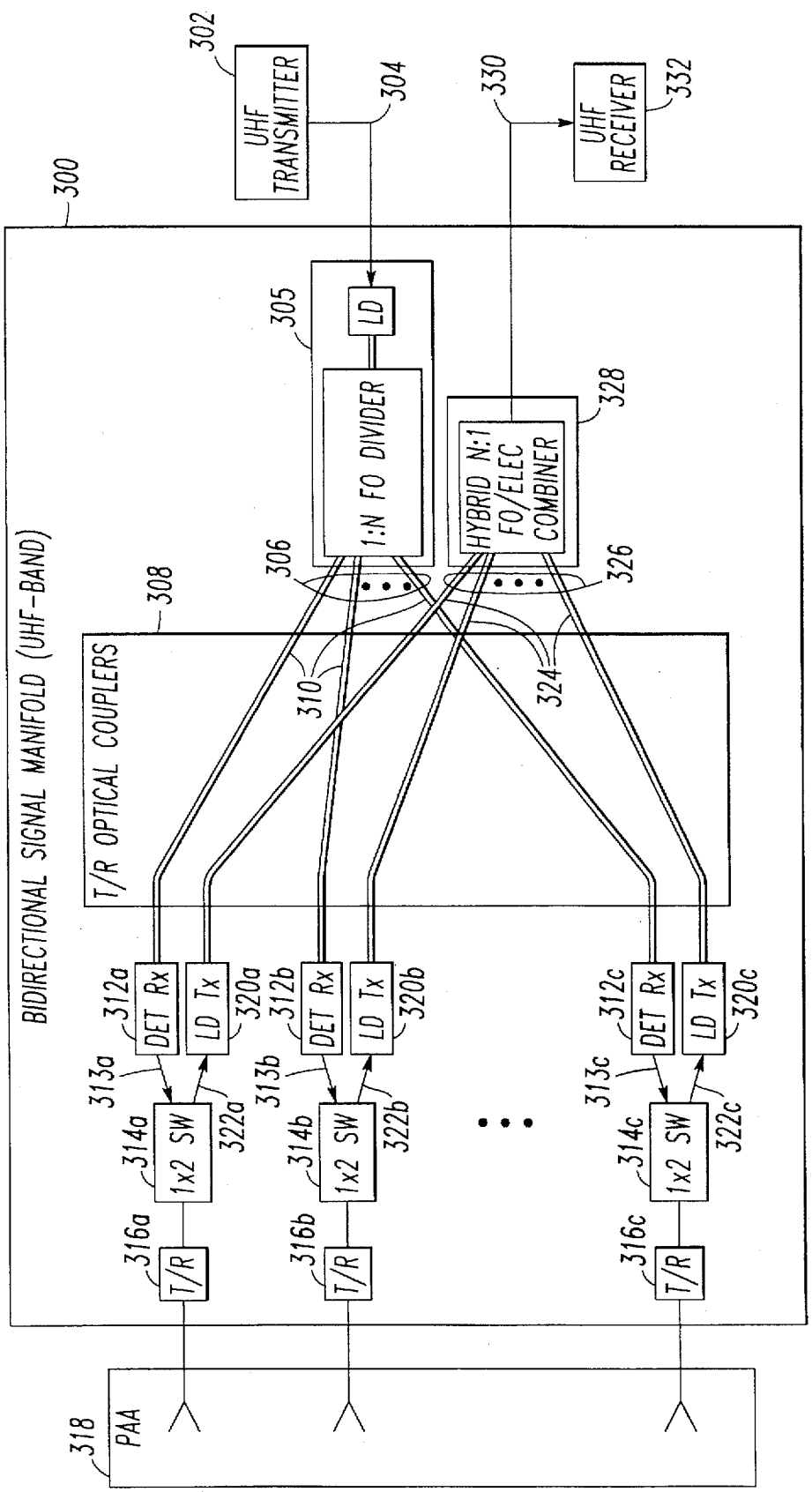
FIG. 7 is a block diagram illustrating one embodiment of a bidirectional signal manifold according to the invention herein.

FIG. 7 illustrates a bidirectional signal manifold 300 which includes transmit and receive signal manifolds. The general configuration of manifold 300 can be tailored to suit the desired manifolds operating frequency range. For example, where manifold 300 is intended for operation in the UHF frequency range, a transmit signal manifold, such as manifold 100 in FIG. 3, can be used in conjunction with a receive signal manifold such as manifold 150 in FIG. 4. Similarly, a bidirectional signal manifold 300 can include transmit signal manifold 190 and receive signal manifold 250 in FIGS. 5 and 6, respectively, for operations using signal frequencies greater than 1.0 GHz, for example, in the "S" frequency band (2.0 GHz–4.0 GHz).

The transmit optical coupler is exemplified by multiple transmit optical fibers 310, and the transmit signal sink converter is exemplified by optical detectors 312a–c. Similarly, the receive optical coupler is exemplified by receive optical fibers 324, and the receive source signal converter is exemplified by optical sources 320a–c. Also, for simplicity, optical coupler 308 is shown having the aggregate of fibers 310 and 324 to indicate the bidirectional nature of manifold 300. In FIG. 7, with manifold 300 in the transmit mode, RF transmitter 302 can provide transmit source electronic signal 304 to transmit source signal converter 305. Converter 305 produces transmit optical signal 306 responsive to electronic signal 304. Signal 306 is conveyed to the transmit signal sink converter by transmit/receive optical coupler 308.

Detectors 312a–c produce transmit sink electronic signals 313a–c, responsive to optical signal 306. Signals 313a–c can be directed to the appropriate elements of PAA 318 via duplexers 314a–c. Where additional signal amplification is needed transmit/receive modules 316a–c can be used. Modules 316a–c contain transimpedance and voltage amplifiers as illustrated in FIGS. 3–6, and can be used to amplify both transmit and receive signals.

In the receive mode, PAA 318 can detect an RF signal which may be amplified in modules 316a–c and directed by duplexers 314a–c to optical detectors 320a–c as receive source electronic signals 322a–c. Signals 322a–c are converted into receive optical signal 326 and converted to receive sink signal detector 328 via receive optical fibers 324. Converter 328 can selectively combine the portion of signal 326 and convert signal 326 into receive sink electronic signal 330. Signal 330 then is provided to the RF sink, which is RF receiver 332.

The aforementioned low-loss asymmetric fiber-optic combiner (LAFC), and a method for producing the same, is provided herein. FIGS. 8a–d and 9a–d illustrate two such LAFCs.

Figure 8A:
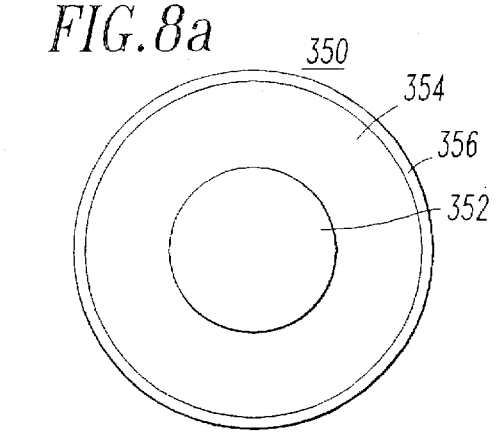
FIGS. 8a–d illustrate one embodiment of a 3×3 low-loss asymmetric fiber-optic combiner according to the invention herein.
Figure 8B:
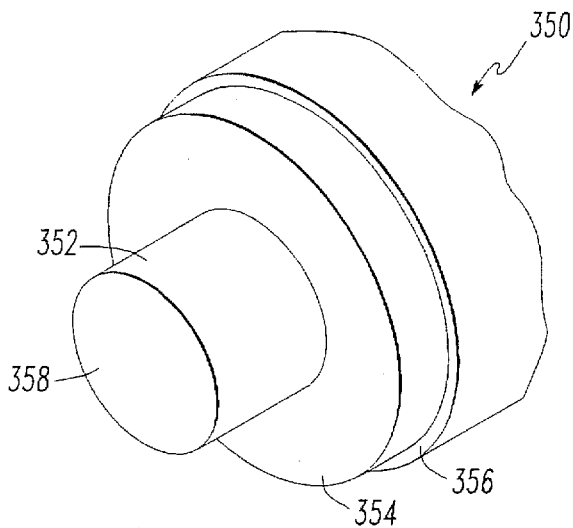
Figure 8C:
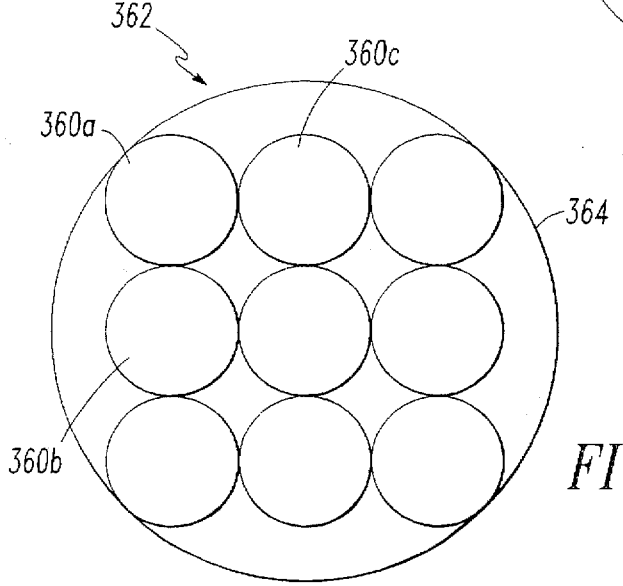
Figure 8D:
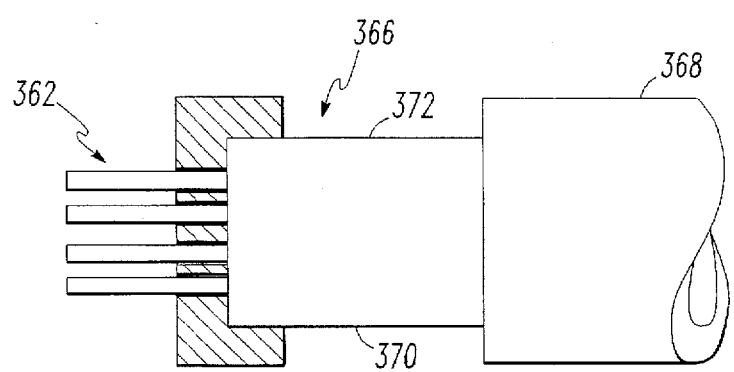

FIG. 8a shows the cross-section of a single graded-index 50/125 µm optical fiber which can be used in a LAFC operating in the UHF frequency range. Fiber 350 can include optical core 352 having a first predetermined diameter, cladding 354 disposed co-axially around core 352, and buffer coat 356 similarly cladding 354. The first predetermined diameter of core 352 can be approximately 50 µm. The thickness of cladding 354 and coat 356 may vary, but in any event, the total diameter of fiber 350 can be about 125 µm. In FIG. 8b, a portion of fiber 350 can be seen, with cladding 354 being substantially removed for a preselected distance from end 358 of fiber core 352. In this particular embodiment, a layer of cladding 354 about 2 µm thick is left on core 352. In FIG. 8c, multiple exposed optical cores, as exemplified by the cross-sections of cores 360a–c, can be joined in a predefined configuration to form optical core bundle 362, having a bundle diameter. In FIG. 8c, nine optical fibers can be so prepared and joined in a closest-packing configuration, to fit within a desired combiner cross-section 364. In FIG. 8d, optical core bundle 362 can be optically coupled to plenum optical fiber 366, the core of which having a second predetermined diameter. To minimize optical losses between core bundle 362 and fiber 366, fiber 366 is selected such that the second predetermined diameter is generally at least that of the bundle diameter, and the second predetermined diameter of core 372 typically is selected to fit within the active region of optical detector 368. In the embodiment of FIG. 8d, the second predetermined diameter is about 220 µm. Plenum fiber 366 also can have cladding such that the total diameter of fiber 366 is about 250 µm. The cladding of fiber 366 also can substantially be removed, leaving a thin cladding layer 370 on core 372. In the 3×3 format of FIG. 8c, eight fibers may be used for LAFC inputs with the ninth fiber being an unused spare.

For higher operating frequencies, for example greater than 1.0 GHz, including the "S" band (about 2.0 GHz to about 4.0 GHz), LAFCs having high combiner ratios may be desirable. Because the diameter of the active sensing area of a typical optical detector for high-frequency operation can be about 50 µm, the LAFC cross-section diameter like-wise can be limited to about 50 µm. A high-ratio LAFC meeting this requirement can be fabricated using single-mode 9/125 µm optical fibers as input fibers.

Figure 9A:
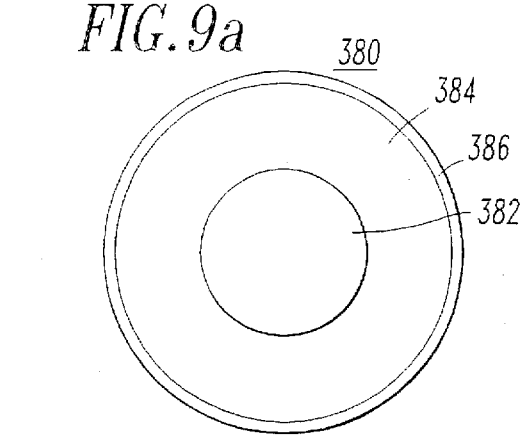
FIGS. 9a–d illustrate one embodiment of a 4×4 low-loss asymmetric fiber-optic combiner according to the invention herein.
Figure 9B:
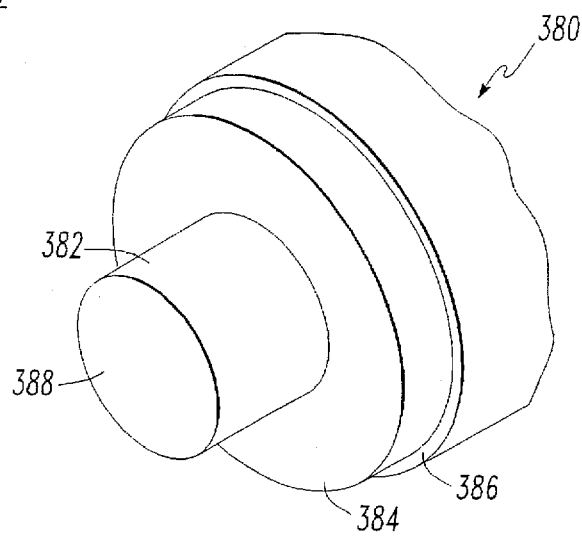
Figure 9C:
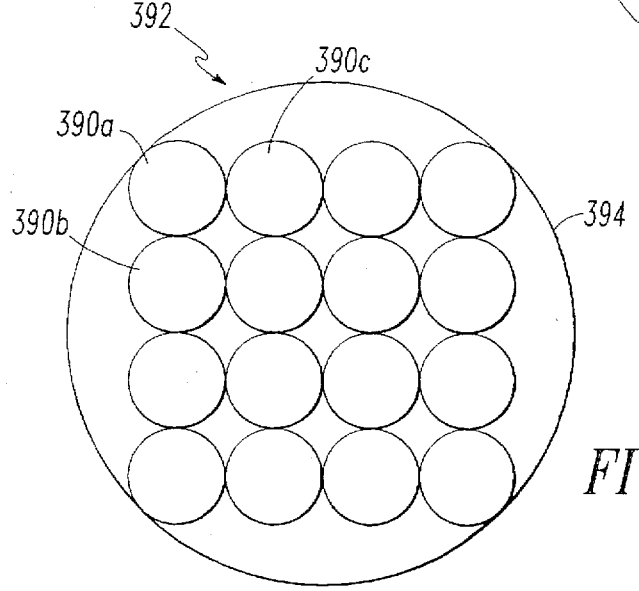
Figure 9D:
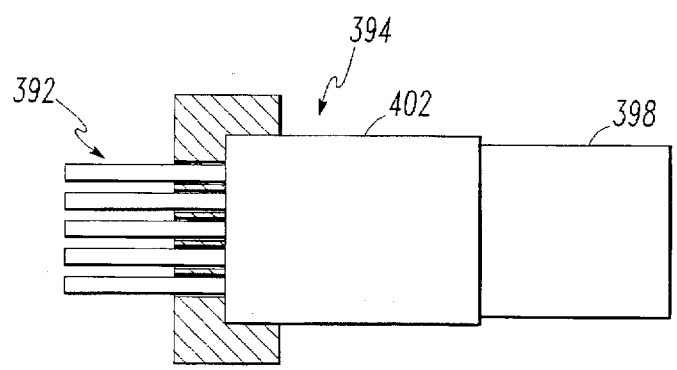

FIG. 9a illustrates one such optical fiber 380 which can have optical core 382 having a first predetermined diameter, cladding 384 disposed co-axially around core 382, and buffer coat 386 similarly disposed around cladding 384. Core 382 is approximately 9 µm. Although the individual thicknesses of cladding 384 and coat 386 can vary, the typical total fiber diameter is about 125 µm. In FIG. 9b, a portion of fiber 380 can be seen, with cladding 384 being substantially removed for a preselected distance from end 388 of fiber core 382. In this particular embodiment, cladding 384 can be completely removed from core 382. In FIG. 9c, multiple exposed optical cores, as exemplified by the cross-sections of cores 390a–c, can be joined in a predefined configuration to form optical core bundle 392 having a bundle diameter. In FIG. 9c, sixteen optical fibers can be so prepared and joined in a closest-packing configuration, to fit within a desired combiner cross-section 394. In FIG. 9d, optical core bundle 392 can be optically coupled to 50/125 µm plenum optical fiber 396 having a second predetermined diameter. To minimize optical losses between core bundle 392 and fiber 396, fiber 396 is selected such that the second predetermined diameter is generally at least that of the bundle diameter, and the second predetermined diameter of core 402 of fiber 396 typically is selected to fit within the active region of optical detector 398. In the embodiment of FIG. 9d, the second predetermined diameter also is about 50 µm. Plenum fiber 396 also can have cladding such that the total diameter of fiber 396 is about 125 µm. If desired, the cladding of fiber 36 also can substantially be removed, leaving a thin cladding layer 400 on core 402.

Figure 10:
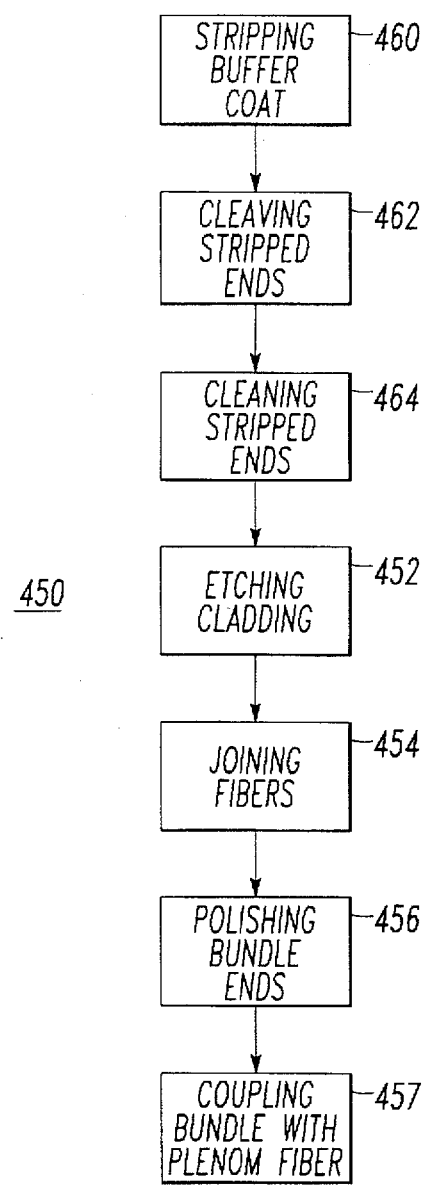
FIG. 10 is a flow diagram of one embodiment of the method for fabricating a low-loss asymmetric fiber-optic combiner according to the invention herein.

FIG. 10 shows a flow diagram for method 450 for producing the aforementioned LAFCs. Generally, method 450 can proceed by etching away, step 452, the cladding from the core of a selected end portion of each of the input optical fibers to be processed. Etching can be accomplished using a suitable etching technique and etchant. When the optical fibers are glass optical fibers, a wet etching technique can be used. Also, a glass etchant, such as hydrofluoric acid, can be used with the duration of etching and solution concentration being adjusted for the fiber size, the thickness of the cladding, the desired amount of residual cladding, the desired etching rate, and the like. After etching is completed, the optical fibers so treated provide multiple, exposed optical core segments.

Method 450 continues by collaterally joining, step 454, the multiple, exposed optical core segments together using a suitable joining technique, to form an optical core bundle having a bundle end. The bundle end can have a bundle diameter which corresponds to the number of optical cores so joined and the diameters of the individual cores. The joining technique can include gluing the individual fibers by applying a thin coat of optical glue to each fiber. Polishing, step 456, the bundle end can render coplanar the ends of the joined fibers in the fiber bundle. Polishing can assure that no differential lengths or gaps exist between adjacent core segments of the bundle, and can be attained by standard fiber-optic polishing equipment. The LAFC is produced by coupling, step 458, the planar bundle end to the end of a plenum optical fiber core. To minimize optical losses from the bundle, the diameter of the plenum fiber core is generally at least that of the diameter of the bundle.

In general, three coupling techniques may be used. First, the planar bundle end can be directly fused to end of the plenum fiber core with commercially-available fiber-fusion equipment. Second, the coupling technique can include applying a preselected optical cement, such as an UV cement, to at least one of the plenum fiber end and the bundle end and butt-coupling the ends of the plenum fiber and bundle. A suitable UV cement is NOA-61 by Norland Products, Inc, New Brunswick, N.J. Third, the plenum fiber and bundle ends can be coupled by interposing a preselected coupling lens therebetween and joining the plenum fiber, lens, and bundle with a suitable optical cement such as the aforementioned NOA-61 UV cement.

Where the input optical fibers have a buffer coat surrounding the cladding, method 450 can include stripping, step 460, a portion of the buffer coating from each of the selected fiber end portions, thus exposing the cladding, and providing a number of stripped fiber end segments. Method 450 also can include cleaving, step 462, the stripped fiber end segments, which is desirable to ensure the provision of a polished fiber end. In order to remove residual buffer coat, method 450 includes cleaning, step 364, the stripped fiber end segments using a preselected solvent, such as acetone.

While specific embodiments of practicing the invention have been described in detail, it will be appreciated by those skilled in the art that various modifications and alternatives to those details could be developed in light of the overall teachings of the disclosure. Accordingly, the particular arrangements and methods disclosed are meant to be illustrative only and not limiting to the scope of the invention which is to be given the full breadth of the following claims, and any and all embodiments thereof.

We claim:

1. A transmit signal manifold, comprising:
   (a) a source signal converter;
   (b) a sink signal converter;
   (c) said source signal converter being coupled to an S-band RF transmitter source for converting an S-band source electronic signal from said S-band RF transmitter source into an optical signal;
   (d) an optical coupler operably coupled to said source signal converter, said optical coupler having a plurality of optical fibers;
   (e) said source signal converter including an optical source and a first fiber-optic divider coupled between said optical source and said optical coupler, said optical source producing said optical signal responsive to said S-band source electronic signal, said divider selectively conveying said optical signal to said plurality of optical fibers;
   (f) said source signal converter additionally including an RF divider coupled to said S-band RF transmitter source, said RF divider having a first predetermined RF divider ratio;
   (g) said optical source including a laser for producing an optical carrier signal with a preselected carrier wavelength, and a plurality of Mach-Zehnder electro-optical modulators for modulating said S-band source electronic signal onto said carrier signal providing said optical signal thereby;
   (h) said optical coupler including a plurality fiber-optic dividers, each of said plurality of fiber-optic dividers having an input and a plurality of outputs each of said inputs being connected to a respective one of said plurality of Mach-Zehnder electro-optical modulators, each of said outputs being coupled to said sink signal converter;
   (i) said sink signal converter being operably coupled to said optical coupler for converting said optical signal into a sink electronic signal, said sink signal converter being coupled to a phased array antenna sink for conveying said sink electronic signal thereto said sink signal converter including an optical detector coupled to said optical coupler, said optical detector producing said sink signal electronic signal responsive to said optical signal.

2. A transmit-receive signal manifold, comprising:
   (a) a source transmit signal converter coupled to an RF transmitter, and receiving a source transmit electronic signal therefrom, said source transmit signal converter converting said transmit electronic signal into a transmit optical signal;
   (b) an optical transmit coupler operably coupled to said source transmit signal converter, said optical transmit coupler having a first plurality of optical fibers for conveying said transmit optical signal therethrough;
   (c) a sink transmit signal converter operably coupled to said optical transmit coupler and receiving said transmit optical signal therefrom, said sink transmit signal converter being coupled to a phased array antenna, said sink transmit signal converter converting said transmit optical signal into a sink transmit electronic signal and conveying said electronic signal to said antenna;
   (d) a source receive signal converter coupled to said phased array antenna and receiving a receive signal therefrom, said converter converting said source receive electronic signal to a receive optical signal;
   (e) a duplexer interposed between said sink transmit signal converter and said source receive signal converter and said phased array antenna for selectively coupling one of said sink transmit signal converter and said source receive signal converter to said phased array antenna;

(f) an optical receive coupler, including a low-loss asymmetric fiber-optic combiner, operably coupled to said source receive signal converter, said optical receive coupler having a second plurality of optical fibers for conveying said receive optical signal therethrough; and (g) a sink receive signal converter coupled to said optical receive coupler and coupled to an RF receiver for converting said receive optical signal into said sink receive electronic signal and conveying said electronic signal to said RF receiver.

3. A transmit-receive signal manifold, comprising:

(a) a source transmit signal converter coupled to a UHF-band RF transmitter, and receiving a UHF-band source transmit electronic signal therefrom, said source transmit signal converter converting said transmit electronic signal into a transmit optical signal, said source transmit signal converter including a first optical source and a first fiber-optic divider coupled between said first optical source and an optical transmit coupler, said first optical source producing said transmit optical signal responsive to said source transmit electronic signal, said first optical source including a laser diode producing said transmit optical signal with a preselected wavelength, and a laser diode driver for receiving said source transmit electronic signal and energizing said laser diode responsive thereto;

(b) an optical transmit coupler operably coupled to said source transmit signal converter, said optical transmit coupler having a first plurality of optical fibers for conveying said transmit optical signal therethrough, said optical transmit coupler including a first plurality of fiber-optic dividers operably connected in series to said first fiber-optic divider;

(c) a sink transmit signal converter operably coupled to said optical transmit coupler and receiving said transmit optical signal therefrom, said sink transmit signal converter being coupled to a phased array antenna, said sink transmit signal converter converting said transmit optical signal into a sink transmit electronic signal and conveying said electronic signal to said antenna, said sink transmit signal converter including a transmit optical detector coupled to said optical transmit coupler, said transmit optical detector producing said sink transmit electronic signal responsive to said transmit optical signal;

(d) a source receive signal converter coupled to said phased array antenna and receiving a receive signal therefrom, said converter converting said source receive electronic signal to a receive optical signal, said source receive signal converter including a plurality of second optical sources for converting said source receive electronic signal into said receive optical signal, said plurality of second optical sources being selectively coupled to said plurality of optical fibers for conveying said receive optical signal therethrough;

(e) a duplexer interposed between said sink transmit signal converter and said source receive signal converter and said phased array antenna for selectively coupling one of said sink transmit signal converter and said source receive signal converter to said phased array antenna;

(f) an optical receive coupler, including a low-loss asymmetric fiber-optic combiner, operably coupled to said source receive signal converter, said optical receive coupler having a second plurality of optical fibers for conveying said receive optical signal therethrough; and (g) a sink receive signal converter coupled to said optical receive coupler and coupled to a UHF-band RF receiver for converting said receive optical signal into said sink receive electronic signal and conveying said electronic signal to said RF receiver, said sink receive signal converter including an optical combiner coupled to said plurality of optical fibers for receiving said receive optical signal and a second optical detector for producing said sink receive electronic signal responsive to said receive optical signal; and wherein (h) each of said plurality of optical sources includes a laser diode producing a portion of said optical receive signal with a preselected wavelength, and a laser diode driver connected to said laser diode for energizing said laser diode responsive to said source receive electronic signal; and wherein (i) said optical coupler includes at least one second combiner for combining each of said portions into said receive optical signal.

4. A transmit-receive signal manifold, comprising:

(a) a source transmit signal converter coupled to an S-band RF transmitter, and receiving an S-band source transmit electronic signal therefrom, said source transmit signal converter converting said transmit electronic signal into a transmit optical signal, said source transmit signal converter including an RF divider coupled to said RF source and receiving a source transmit electronic signal therefrom, said converter converting said transmit electronic signal into a transmit optical signal by a first optical source, said first optical source including a laser for producing an optical carrier signal with a preselected carrier wavelength, said first optical source further including a plurality of Mach-Zehnder electro-optical modulators for modulating said source transmit electronic signal onto said carrier signal providing said transmit optical signal thereby, said RF divider having a first predefined RF divider ratio;

(b) an optical transmit coupler operably coupled to said source transmit signal converter, said optical transmit coupler having a first plurality of optical fibers for conveying said transmit optical signal therethrough, said optical transmit coupler including a plurality of fiber-optic dividers, each of said dividers having an input and a plurality of outputs, each of said inputs being connected to respective ones of said plurality of Mach-Zehnder electro-optic modulators, each of said outputs being coupled to said sink transmit signal converter, a first stage of said fiber-optic dividers having a predefined fiber-optic divider ratio corresponding to the number of first divider output fibers, each of the remaining fiber-optic dividers having a second predefined divider ratio;

(c) a sink transmit signal converter operably coupled to said optical transmit coupler and receiving said transmit optical signal therefrom, said sink transmit signal converter being coupled to a phased array antenna, said sink transmit signal converter converting said transmit optical signal into a sink transmit electronic signal and conveying said electronic signal to said antenna;

(d) a source receive signal converter coupled to said phased array antenna and receiving a receive signal therefrom, said converter converting said source receive electronic signal to a receive optical signal;

(e) a duplexer interposed between said sink transmit signal converter and said source receive signal converter and said phased array antenna for selectively coupling one of said sink transmit signal converter and said source receive signal converter to said phased array antenna;

(f) an optical receive coupler, including a low-loss asymmetric fiber-optic combiner, operably coupled to said source receive signal converter, said optical receive coupler having a second plurality of optical fibers for conveying said receive optical signal therethrough; and (g) a sink receive signal converter coupled to said optical receive coupler and coupled to an S-band RF receiver for converting said receive optical signal into said sink receive electronic signal and conveying said electronic signal to said RF receiver.

5. The manifold of claim 4 wherein said laser produces said carrier signal at a preselected wavelength of about 1300 nm.

6. The manifold of claim 4 wherein said first predefined divider ratio is 1:8 and said second predefined divider ratio is 1:32 and each of said plurality of combiners has a predefined combiner ratio of 16:1.

* * * * *